US005829282A

United States Patent [19]

Surridge

[11] Patent Number: 5,829,282

[45] Date of Patent: Nov. 3, 1998

[54] CONTROL LEVER LOCK ASSEMBLY

[75] Inventor: David G. Surridge, Knightdale, N.C.

[73] Assignee: Caterpillar Inc., Peoria, Ill.

[21] Appl. No.: 343,011

[22] Filed: Nov. 21, 1994

[51] Int. Cl.[6] .................................................... F16H 57/00

[52] U.S. Cl. ........................ 70/201; 70/DIG. 30; 292/60; 292/63; 292/DIG. 63; 200/318; 200/321

[58] Field of Search ............................. 70/201, 202, 203, 70/DIG. 30, 245–248; 292/173, 174, 279, 283, DIG. 63, 60, 61, 63, 57, 58, DIG. 65, DIG. 20, 219, 240, 163, 207; 200/43.16, 43.19, 43.18, 43.21, 318, 321, 322, 327

[56] References Cited

U.S. PATENT DOCUMENTS

| | | | |
|---|---|---|---|
| 301,804 | 7/1884 | Chevremont | 292/DIG. 20 |
| 484,235 | 10/1892 | Plunkett | 292/DIG. 20 |
| 1,211,111 | 12/1917 | Miller | 292/DIG. 14 |
| 1,310,168 | 7/1919 | Sessions | 200/318 |
| 1,828,698 | 10/1931 | Berry | 292/DIG. 65 |
| 2,426,001 | 8/1947 | Denault . | |
| 2,516,163 | 7/1950 | Vaughan | 200/322 |
| 2,701,287 | 2/1955 | Winter | 200/321 |
| 3,668,340 | 6/1972 | Brown | 200/43.16 |
| 4,203,291 | 5/1980 | Youngers | 60/433 |
| 4,286,810 | 9/1981 | Ehmen | 292/67 |
| 5,062,316 | 11/1991 | Lykken et al. | 74/529 |
| 5,224,707 | 7/1993 | Martin | 70/DIG. 30 |

FOREIGN PATENT DOCUMENTS

| | | |
|---|---|---|
| 312803 | 6/1929 | United Kingdom . |
| 736120 | 8/1955 | United Kingdom . |
| 959112 | 5/1964 | United Kingdom . |

*Primary Examiner*—Darnell M. Boucher
*Attorney, Agent, or Firm*—Claude F. White

[57] ABSTRACT

A lock assembly for locking a control lever in a neutral or non-active position includes a lock mechanism having a locking pin and a locking bracket for receiving the locking pin. The locking bracket is secured to the control lever and prevents the lever from moving when the locking pin is engaged with the bracket. The control lever controls a work function of a work machine and the lock assembly prevents unintentional activation of the control lever.

3 Claims, 2 Drawing Sheets

CONTROL LEVER LOCK ASSEMBLY

TECHNICAL FIELD

This invention relates generally to a lock assembly for a control lever and more particularly to a lock assembly which holds the control lever in a neutral position and is manually manipulated from a locked and unlocked position.

BACKGROUND ART

Work machines, such as wheel loaders, have been designed to utilize a plurality of work implements secured to the forward end of the machine. This makes the machine more versatile and allows the machine to perform a multitude of work functions. To further enhance the performance of the machine, a quick coupling apparatus is often utilized to quickly and conveniently couple and de-couple the work implements to the machine. Operation of the quick coupling apparatus is often controlled by a control lever within the operators compartment.

To make operation of the quick coupling apparatus convenient for the machine operator, the control lever is often adjacent the other machine control levers. Although this makes operation of the coupling device convenient, inadvertent actuation of the coupling control lever during operation or traveling of the machine could damage the work implements and/or the work machine. Providing some type of locking apparatus to hold the control lever in a neutral position is difficult because of space restraints and the close proximity of the control levers.

The present invention is directed to overcoming one or more of the problems as set forth above.

DISCLOSURE OF THE INVENTION

In one aspect of the present invention, a lock assembly for locking a control lever in a first position includes first and second supporting members, a lock mechanism including a locking pin supported within the supporting members, a bracket secured to the control lever, and means for biasing the lock mechanism toward the bracket. The bracket includes a first opening for receiving the locking pin and a second opening for receiving the control lever.

The lock mechanism is intended to lock the control lever in a neutral or non-actuated position so the function controlled by the control valve cannot be performed. In a preferred embodiment, the control lever is intended to operate a quick coupling device for securing various work implements to a work machine. It is important to prevent accidental or inadvertent actuation of the coupling control lever when the machine is moving or otherwise performing various work functions. It is also desirable to have any type of lock mechanism as small and compact as possible in view of space restraints and the close proximity of additional control levers.

The subject lock assembly offers a solution to the above noted problems by being of simple compact design and being easily and manually locked and unlocked.

BEST MODE FOR CARRYING OUT THE INVENTION

Figure 1:
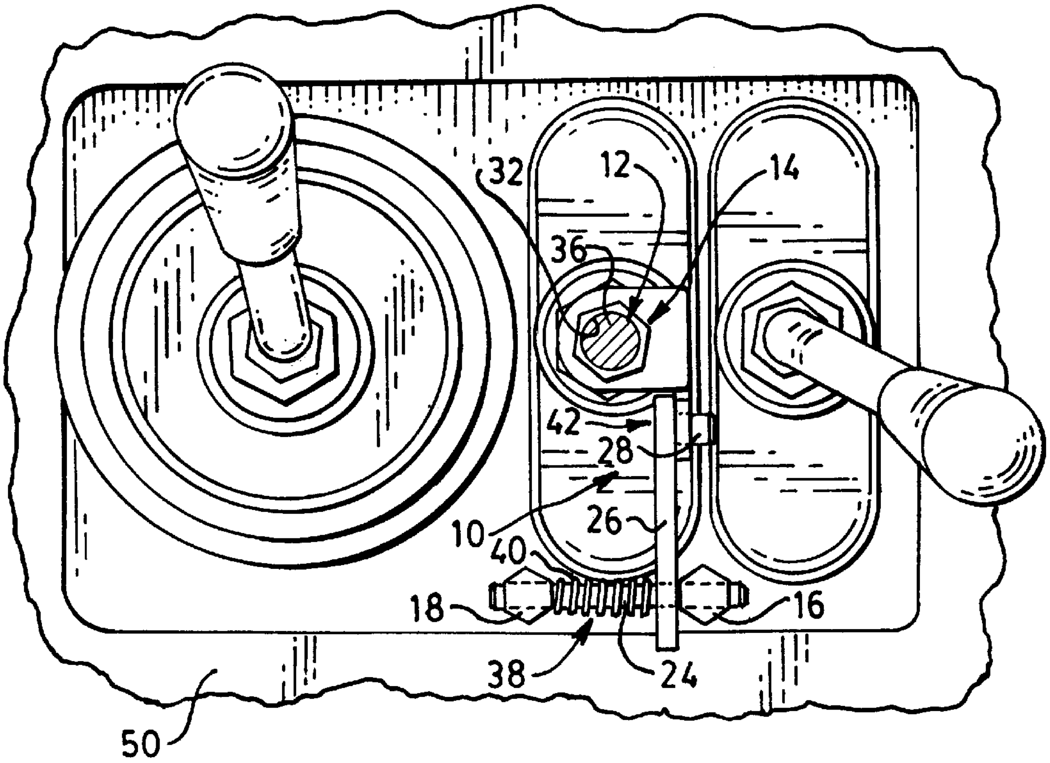
FIG. 1 is a diagrammatic top plan view of a plurality of control levers and the subject lock assembly associated with a particular control lever.
Figure 2:
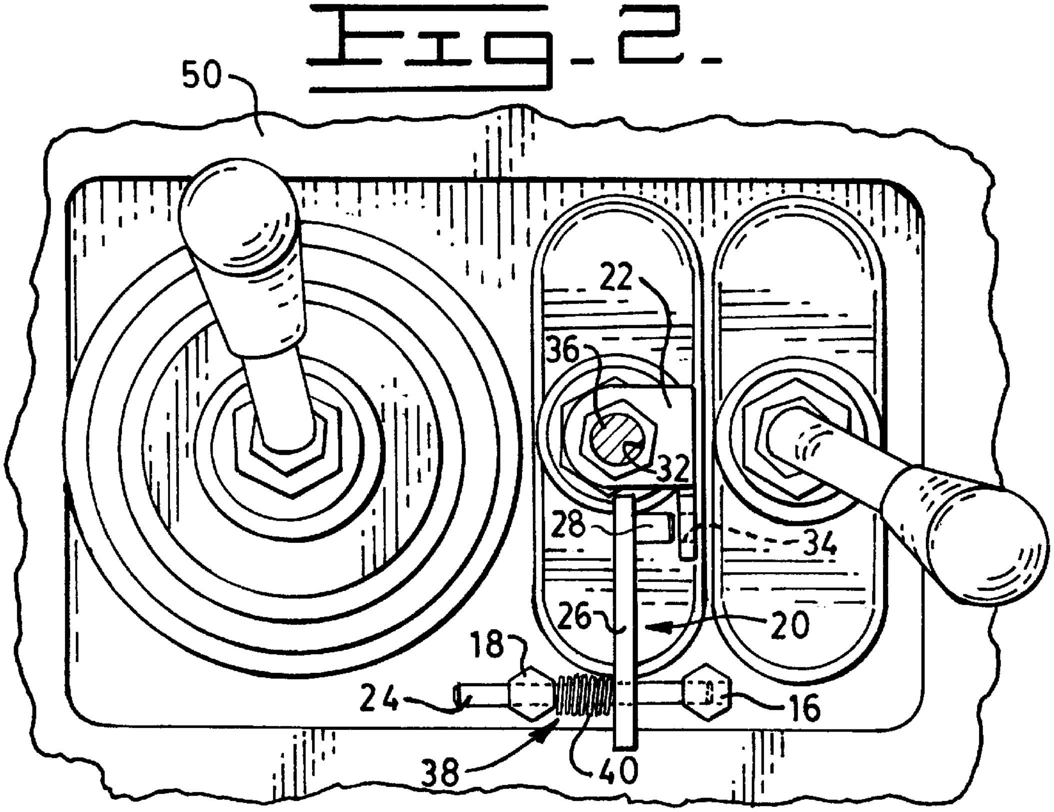
FIG. 2 is a diagrammatic top plan view, similar to FIG. 1, with a lock pin of the subject invention in an unlocked position.
Figure 3:
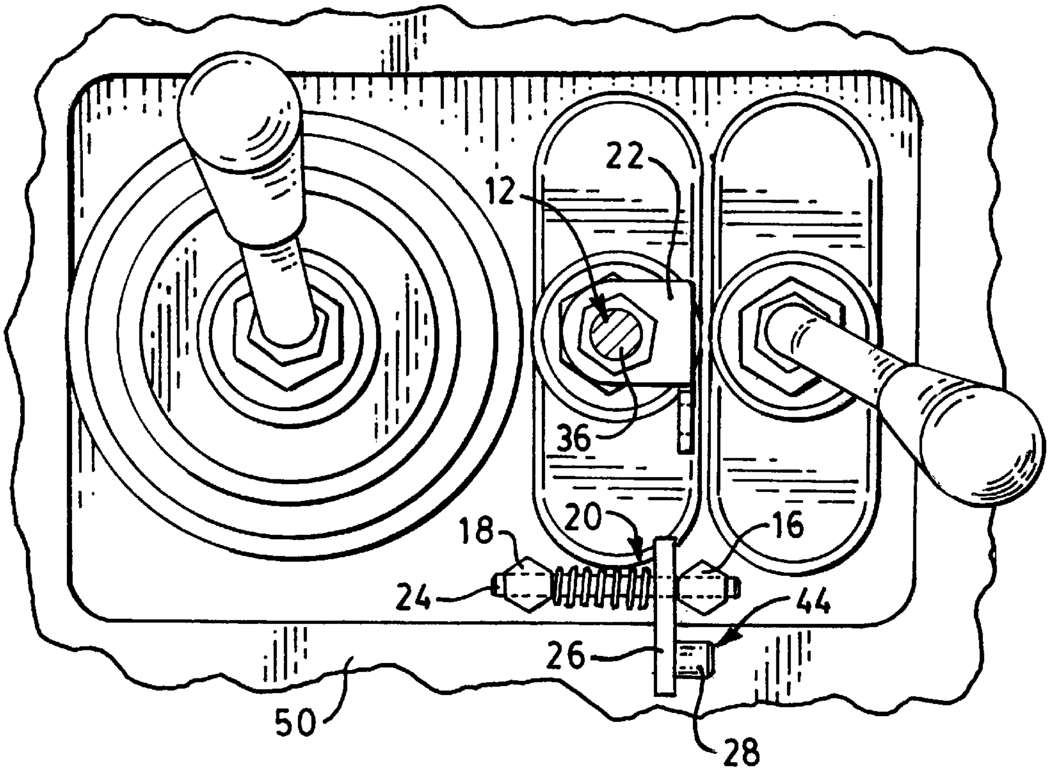
FIG. 3 is a diagrammatic top plan view, similar to FIG. 1, with the locking mechanism of the subject invention rotated to an unlocked and stored position.

With reference to the drawings, a lock assembly 10 for locking a control lever 12 in a first or neutral position 14 includes first and second spaced apart supporting members 16,18, a lock mechanism 20, and a lock bracket 22. The first position of the control lever is a non-actuatable position. The lock mechanism 20 includes a shaft 24, a plate 26, and a locking pin 28. The shaft 24 is rotatably supported within the first and second supporting members 16,18 such that the entire locking mechanism 20 can rotate about the axis 30 of the shaft 24. The lock bracket 22 has first and second openings 32,34 which are adapted to receive respectively the locking pin 28 and the rod portion 36 of the control lever 12. The lock assembly 10 further includes a biasing means 38 in the form of a coil spring 40 which is carried by the shaft 24 and, in the assembled condition of the lock assembly, biases the lock mechanism 20 toward the lock bracket 22 and the first supporting member 16.

The lock mechanism 20 can assume various positions including a first locked portion 42 and a second unlocked and stored position 44. The lock mechanism 20 is held in the locked and unlocked positions 42,44 by the spring 40 and is manually moveable from the locked and unlocked positions 42,44. With the lock mechanism 20 biased toward the locked position 42, the locking pin 20 is adapted to engage the opening 32 in the lock bracket 22. When the locking pin 20 is disengaged from the lock bracket 22 and rotated to the second stored and unlocked position 44, the locking pin 20 moves through an arc such that the first locked position 42 is spaced from the second stored position 44 by an arc of about 225 degrees.

Figure 4:
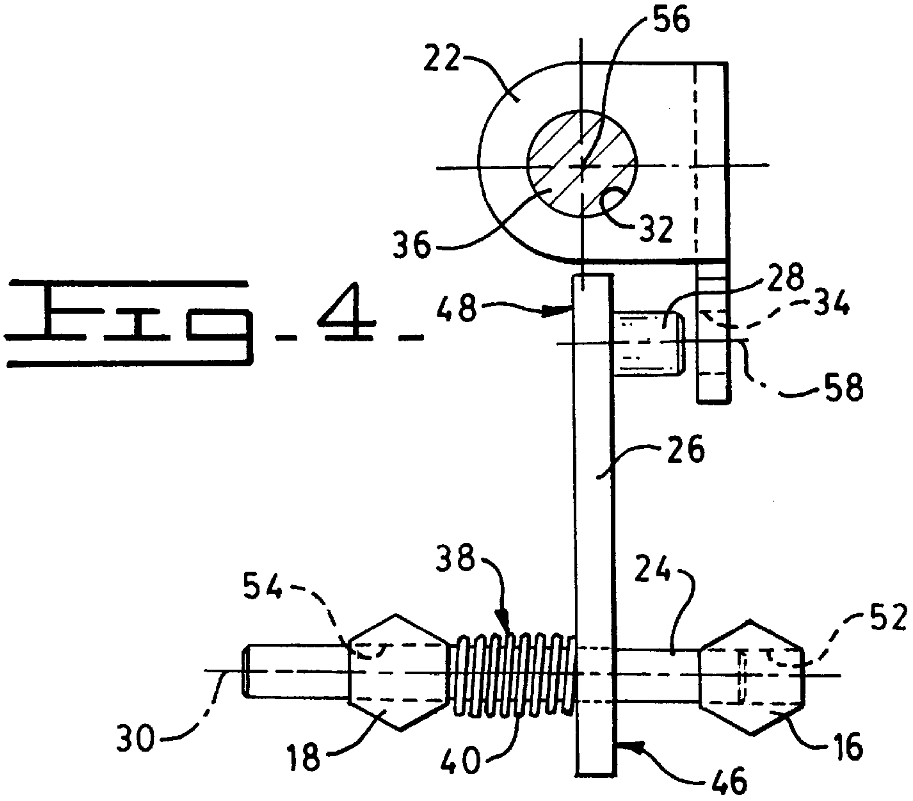
FIG. 4 is a diagrammatic top plan view of the various components of the subject lock assembly.

With particular reference to FIG. 4, the plate 26 has first and second end portions 46,48 with the first end portion 46 being fixed to the shaft 24. The locking pin 28 is fixed to the second end portion 48 of the plate 26 such that the locking pin 28 is substantially normal to the plate 26 and substantially parallel to the shaft 24. The coil spring 40 is positioned on the shaft 24 and is in a compressed condition between the plate 26 and the second supporting member 18. The first and second supporting members 16,18 are removably secured to a housing 50, or other control lever supporting member.

The first and second supporting members 16,18 have respective transverse through bores 52,54 which accommodate the shaft 24. The through bores 52,54 are slightly larger in diameter than the diameter of the shaft 24. This permits the shaft 24 to slide back and forth and rotate within the supporting members 16,18. Since the plate 26 is secured to the shaft 24 and the pin 28 is secured to the plate 26, the plate 24 and pin 28 move and rotate with the shaft 24. The first opening 32 in the lock bracket 22 has a first axis 56 and the second opening 34 has a second axis 58. The first axis 56 is spaced from the second axis 58 and is substantially perpendicular thereto.

Industrial Applicability

With reference to the drawings and the previous description, the subject lock assembly 10 is particularly useful for locking a control lever 12 of a work machine (not shown) in a neutral or non-actuatable position 14. The control lever 14 is intended to actuate a work function, such as operation of a quick coupling apparatus. Once the quick coupling apparatus is actuated, it is important to prevent inadvertent or accidental actuation of the control lever 12. The subject lock assembly 10 accomplishes this by locking the control lever 12 in a neutral position 14 until it is manually unlocked.

Assuming that the lock mechanism 20 is in the first unlocked position 44, the machine operator manually pushes the lock mechanism 20 toward the second supporting member 18 and against the bias of the spring 40. The lock mechanism 20 is then rotated until the locking pin 28 aligns with the second opening 34 in the lock bracket 22. The lock mechanism 20 is then released and the spring 40 forces the locking pin 28 into the opening 34 to engage with the lock bracket 22. The control lever 12 is now locked and prevented from being actuated until the lock mechanism 20 is unlocked and moved to the unlocked position 44. Unlocking of the lock mechanism 20 is essentially a reversal of the locking operation.

Other aspects, objects and advantages of this invention can be obtained from a study of the drawings, the disclosure, and the appended claims.

I claim:

1. A lock assembly, comprising:

a control lever pivotal adapted to be locked in a first position;

a housing;

first and second spaced apart supporting members secured to said housing;

a lock mechanism including a locking pin, and a shaft having a first end portion rotatable supported within said first supporting member and a second end portion rotatable supported within said second supporting member;

a bracket having first and second openings which are adapted to receive respectively said locking pin and said control lever; and means for biasing said lock mechanism toward said bracket and said first supporting member;

wherein said first opening has a first axis and said second opening has a second axis, said first axis being spaced from and substantially perpendicular to said second axis.

2. A lock assembly, comprising:

a control lever pivotal adapted to be locked in a first position;

a housing;

first and second spaced apart supporting members secured to said housing;

a lock mechanism including a locking pin, and a shaft having a first end portion rotatable supported within said first supporting member and a second end portion rotatable supported within said second supporting member;

a bracket having first and second openings which are adapted to receive respectively said locking pin and said control lever; and means for biasing said lock mechanism toward said bracket and said first supporting member;

wherein said lock mechanism includes a shaft adapted to be rotatably supported within said first and second supporting members, a plate having first and second end portions, said first end portion being fixed to said shaft and, said locking pin being fixed to said second end portion of said plate; and wherein said locking pin is substantially normal to said plate and substantially parallel to said shaft.

3. A lock assembly for locking a control lever in a first position, comprising:

first and second spaced apart supporting members;

a lock mechanism including a locking pin rotatably supported within said first and second supporting members;

a bracket having first and second openings which are adapted to receive respectively said locking pin and said control lever;

means for biasing said lock mechanism toward said bracket and said first supporting member; and a shaft rotatably supported within said first and second supporting members, a plate having first and second end portions, said first end portion being fixed to said shaft and, said locking pin being fixed to said second end portion of said plate, and being substantially normal to said plate and substantially parallel to said shaft.

* * * * *